Figure 1:
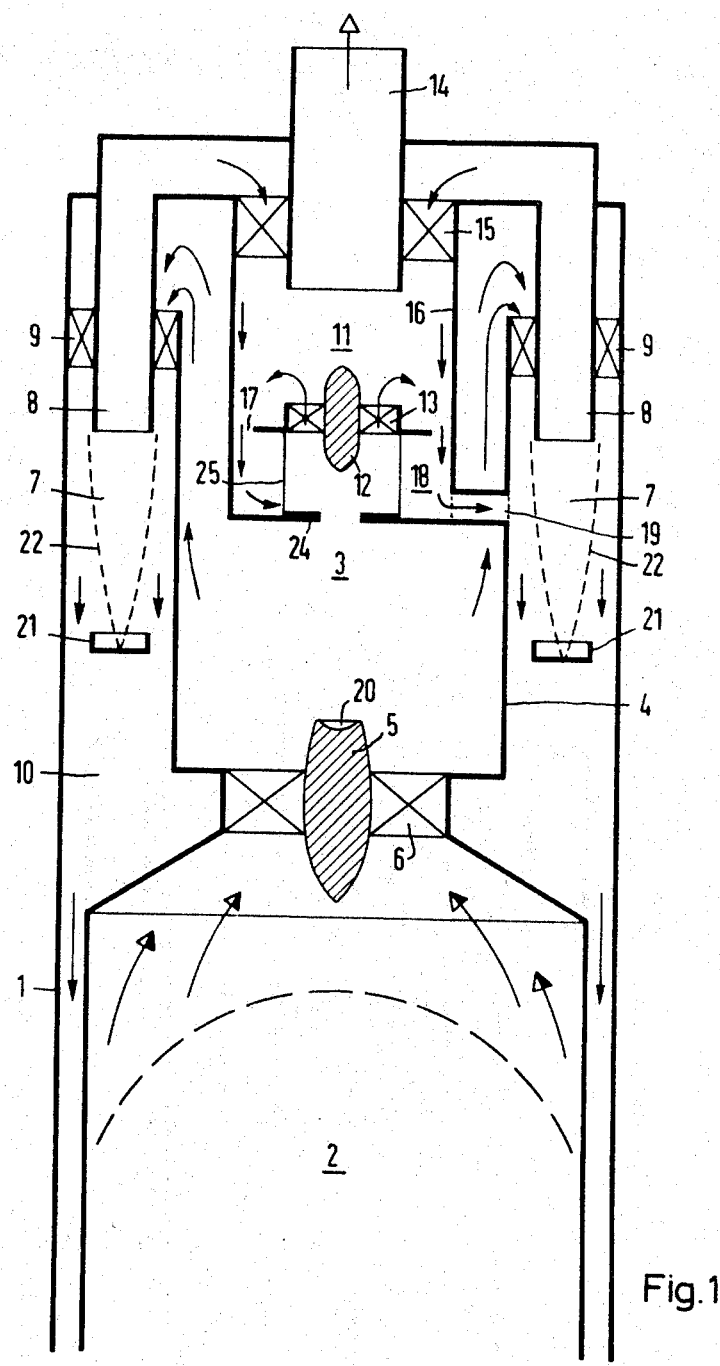

United States Patent [19]
Klein et al.

[11] 3,769,781
[45] Nov. 6, 1973

[54] APPARATUS FOR DRYING STEAM IN NUCLEAR POWER STEAM GENERATORS PLANTS

[75] Inventors: Heinrich Klein; Rudolf Pieper, both of Erlangen; Alfred Hoffmann, Forchheim, all of Germany

[73] Assignee: Siemens Aktiengesellschaft, Berlin and Munich, Germany

[22] Filed: Oct. 12, 1971

[21] Appl. No.: 188,258

[30] Foreign Application Priority Data
Oct. 20, 1970 Germany................. P 20 51 310.4

[52] U.S. Cl................... 55/261, 55/343, 55/426, 55/449, 55/457, 55/DIG. 23, 122/34, 122/491
[51] Int. Cl.......... B04c 3/06, B04c 5/26, B04c 5/28
[58] Field of Search................. 55/261, 263, 343, 55/426, 427, 449, 456, 457, 459, DIG. 23; 122/34, 491, 492

[56] References Cited
UNITED STATES PATENTS

| | | | |
|---|---|---|---|
| 3,057,333 | 10/1962 | Kuhner | 122/491 |
| 3,195,515 | 7/1965 | Blizard | 122/34 |
| 3,358,844 | 12/1967 | Klein et al. | 55/261 X |
| 3,477,569 | 11/1969 | Klein et al. | 209/144 |

Primary Examiner—Dennis E. Talbert, Jr.
Attorney—Arthur E. Wilfond

[57] ABSTRACT

Apparatus for drying the steam of a steam-water mix generated by a steam generator has an axial cyclone arranged above the steam generator for separating at least a portion of the water from the steam-water mix so as to yield separated water and a remaining steam-water mix and for passing the water and the remaining mix in an upward direction. A plurality of counter-flow cyclones for receiving therein the separated water separated from the mix in said axial cyclone are also provided and each of the counter-flow cyclones has a wall defining a turbulence chamber, a tube extending into the chamber, and inlet guide vanes disposed concentric to the tube for imparting a spin motion to the separated water for separating the latter into water and clarified steam in the chamber. A tornado-flow separator for separating the remaining mix into additional water and clarified steam is disposed above and coaxial with the axial cyclone. The tornado-flow separator has a lower axial inlet for admitting the remaining mix as well as having an upper outlet for discharging clarified steam. The tornado-flow separator also has an upper auxiliary gas inlet coaxial with the upper outlet for admitting the clarified steam separated in the counter-flow cyclones.

10 Claims, 2 Drawing Figures

APPARATUS FOR DRYING STEAM IN NUCLEAR POWER STEAM GENERATOR PLANTS

Our invention relates to an apparatus for drying steam in steam generators of nuclear power plants. More specifically, several counter-flow cyclones are arranged concentric to an axial cyclone above the steam generator. Coaxial to the axial cyclone, there is provided a tornado separator having an axial lower inlet for the steam flowing from the axial cyclone and having an auxiliary gas inlet arranged coaxially to the dry steam outlet for the steam flowing from the counter-flow cyclones.

In nuclear power plants which operate with light water reactors, steam is generated with a high end dampness, so that this steam must be subjected to a very costly drying operation before it is introduced into the turbines. For this purpose, coarse separators functioning on the centrifugal force basis are generally used, to which must be connected subsequent stages of expensive fine separators. The centrifugal force generated in the centrifugal-force separators would be sufficient to separate all water drops entrained in the steam, however, contaminating effects such as, for example, the uncontrolled wandering of the funnel-foot of the funnel figure or form developed in the centrifugal-force separators make it such that the water already separated becomes reentrained in the clarified steam flow, or that the clarified steam becomes entrained with the separated water whereby, the efficiency of this separator is considerably reduced. Because of this poor efficiency, additional cost is incurred because of the need for fine separators connected in cascade; these subsequent fine separators cause a large construction height of the steam generators which introduces a considerably high additional cost with large unit capacities.

It is an object of the invention to provide an apparatus for increasing the efficiency of coarse separators so as to make it unnecessary to use the fine separator previously required, and to so considerably reduce the space required by the apparatus as well as the costs of the steam generator.

According to the invention, the individual separators are modified and an efficaceous serial and parallel connection of several centrifugal-force separators is provided to achieve the foregoing objects.

According to a feature of the invention, several counter-flow cyclones through which a medium flows from top to bottom are arranged concentric to an axial cyclone disposed above the steam generator and through which a medium flows from bottom to top. Also provided are inlet guide vanes arranged centric to a tube extending into counter-flow cyclones, respectively. Above the axial cyclone and concentric thereto, there is disposed a tornado-flow separator having an axial lower inlet for the steam flowing from the axial cyclone and having an auxiliary gas inlet arranged coaxially with respect to the upper dry steam outlet. The auxiliary gas inlet accommodates the steam flowing from the counter-flow cyclones.

By means of this multi-stage drying or clarification of the steam and the subsequent separation of the steam still entrained in the water already separated, there is obtained the result that at the end of the last centrifugal force separation, practically dry steam is obtained so that an additional fine separator is no longer required.

The counter-flow cyclones can be arranged outside of the turbulence tube of the axial cyclone so as to place the inlets of the counter-flow cyclones so that they extend approximately at the height of the upper end of the turbulence tube. With this type of arrangement, it is preferable, if the water outlets of the tornado-flow separator feed into the lower region of the counter-flow cyclones.

In addition, the inlets of the counter-flow cyclones can be arranged within the turbulence tube of the axial cyclone at the outer region of the axial cyclone. In this way the water outlets of the counter-flow cyclones and of the tornado-flow separator can terminate in a common water outlet channel.

For subseuqent drying of the steam flowing out from the counter-flow cyclones, it is preferable if the tubes of these counter-flow cyclones extending into the turbulence chambers of the same are joined or connected with the upper auxiliary gas inlet of the tornado-flow separator.

In order to stabilize the flow in the individual centrifugal-force separators, it is preferable if the central flow body of the axial cyclone is provided with an approximately concave recess at its upper end, the flow body being surrounded by guide vanes for imparting a spin motion. Also, it is preferable if, in the lower region of the counter-flow cyclone, there are provided coaxial shell-like stabilization bodies which open toward the top, these shell-like stabilization bodies being arranged to stabilize the respective funnels which form in the counter-flow cyclones.

Such stabilization bodies as well as providing the flow body with a recess are discussed in considerable detail in the related copending applications:

Ser. No 188,253, filed Oct. 12, 1971, and
Ser. No. 188,101, filed Oct. 12, 1971.

Figure 2:
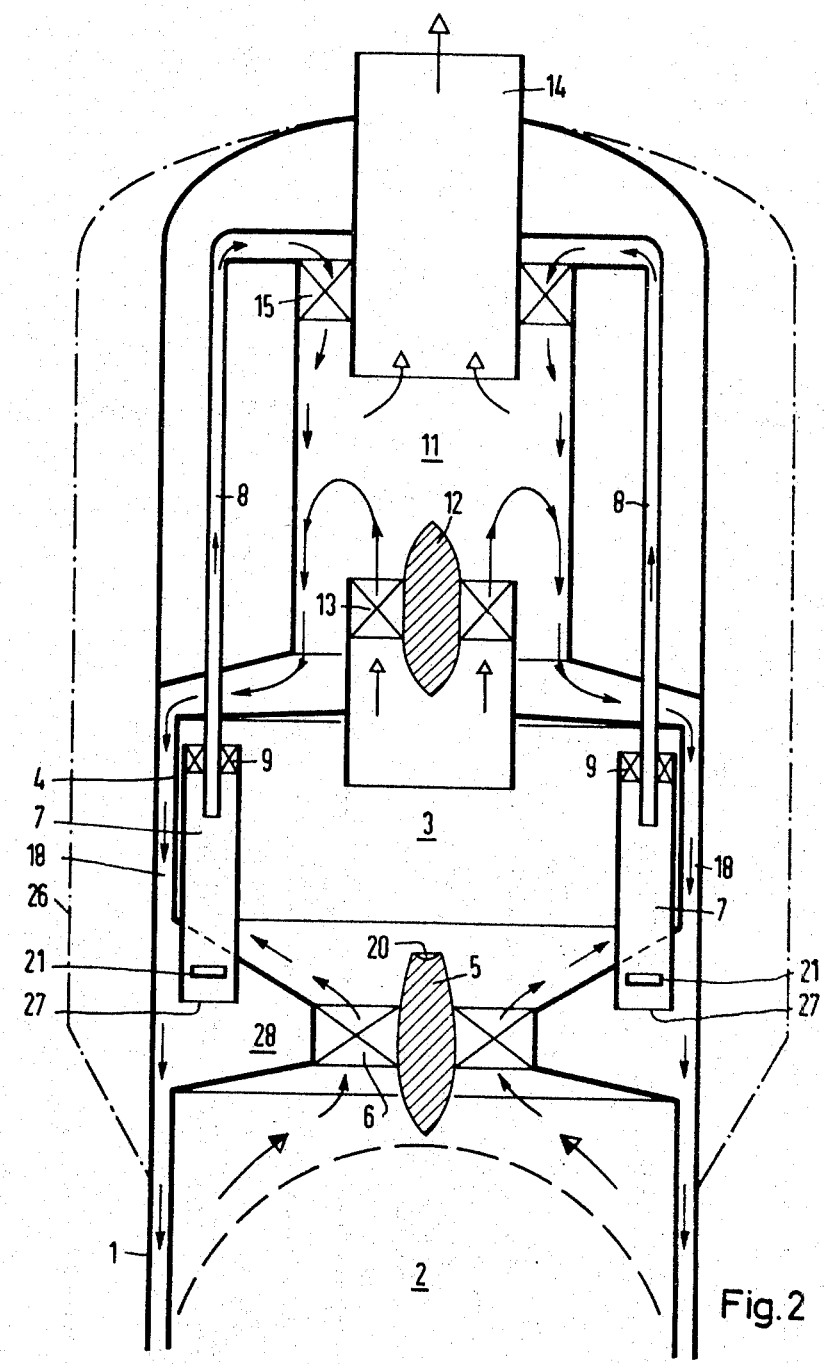

Although the invention is illustrated and described herein as an apparatus for drying steam in steam generators of nuclear power plants, it is nevertheless not intended to be limited to the details shown, since various modifications may be made therein within the scope and the range of the claims. The invention, however, together with additional objects and advantages will be best understood from the following description and in connection with the accompanying drawings, in which:

FIG. 1 illustrates, in schematic representation, a separator equipped with counter-flow cyclones arranged around a axial cyclone; and FIG. 2 is an arrangement of the counter-flow cyclones within the turbulence tube of an axial cyclone.

Referring to FIG. 1, an axial cyclone 3 is disposed above the U-tube bundle 2 through which passes the reactor cooling medium. The wet steam rising from the U-tube bundle 2 impinges the axial cyclone 3. The axial cyclone 3 comprises a turbulence tube 4 and has guide vanes 6 arranged at its inlet end in concentric arrangement to a flow body. The guide vanes 6 impart a spin motion to the entering steam-water mix. This sends the entering mix into rotation and causes water contained in the mix to be thrown against the inner wall of the turbulence tube 4. The separated water then flows along the inner wall of the turbulence tube upwardly and reaches the counter-flow cyclones 7 after being diverted at the upper end of the turbulence tube 4. The counter-flow cyclones are arranged concentrically to the axial cyclone.

Counterflow cyclones 7 comprise a cylindrical turbulence chamber with an axial tube 8 extending into the cyclone 7 at the upper end of the latter. The inlet guide vanes 9 concentrically surround the tube 8 extending into the cyclone 7 and impart a spin motion to the entering mix. The water containing residual steam entering via the guide vanes 9 is again separated by the action of centrifugal force into water and steam so that the water runs downwardly to the water collection enclosure 10, whereas the steam flows upwardly via the axial tube 8.

For after drying the steam from the axial cyclone 3 and the counter-flow cyclones 7, tornado-flow separator 11 is arranged above the axial cyclone and concentric therewith. Such a tornado-flow separator 11 has a lower axial inlet for admitting the mix to be separated, and an auxiliary gas inlet is provided in the turbulence chamber shell or at the upper end face of the turbulence chamber shell. The auxiliary gas inlet is positioned so as to be directed opposite to the axial lower inlet of the separator 11. The clarified medium then leaves the tornado-flow separator on the end thereof lying opposite the axial mix inlet whereas, the separated heavier medium flows away through a ring gap coaxial to the axial inlet through which the mix enters.

For the illustrated embodiment, the steam flows out of the axial cyclone 3 from below over the guide vanes 13 coaxially surrounding the flow body 12 in the actual tornado-flow separator chamber 11. The steam flowing out of the counter-flow cyclones 7 via the tube 8 is directed through a guide vane wreath 15 from above into the tornado-flow seaparator 11. The guide vane wreath 15 concentrically surrounds the outlet tube 14 for discharging the dried or clarified steam. The water which is still contained in the steam flowing from below from the axial cyclone is thrown against the inner wall of the turbulence chamber 16 of the tornado-flow separator 11 by the action of the centrifugal force and the carry-along or sweeping force; this water is carried by means of the downwardly directed counter-flow generated by the guide vane wreath 15 through a ring gap 17 arranged concentric to the lower inlet 25. From here, the water flows via channels 19 into the lower region of the counter-flow cyclones 7. The substantially dried steam leaves the tornado-flow separator 11 upwardly through the axial discharge tube 14 towards the top and can be directed from here directly to the turbine.

For improving the separating capacity of the individual centrifugal-force separators, the following configurations are applicable. First, the central flow body 5 of the axial cyclone 3 is provided with a recess means 20 at its upper end in the form of an approximately concave recess 20. The recess causes the funnel-like figure or form, which forms in the axial cyclone 3 and which constitutes the boundary layer between separated water and clarified steam in the axial region of the cyclone, to become stabilized with regard to its position. In this way, definite flow relationships or conditions are established in the axial cyclone, so that an entrainment of water already separated with the clarified steam is prevented.

According to the same principle, corresponding stabilization means 21 are arranged in the counter-flow cyclones 7. These comprise stabilization bodies 21 arranged coaxially in the lower region of the counter-flow cyclones 7 and configured so as to open upwardly in a shell-like configuration. This serves to stabilize the funnel FIG. 22 formed in the counter-flow cyclones 7 and hinders the uncontrolled wandering of the funnel foot over the cross-section of the cyclone. This stabilization body 21 especially prevents an entrainment of the steam funnel, which builds axially, by the water running off, so that no losses occur with regard to already separated steam.

In order to adjust the required pressure differences in the individual separators, it is further preferable if an aperture 24 is built into the tornado-flow separator 11 at the inlet 25 thereof.

FIG. 2 illustrates an alternate embodiment wherein an axial cyclone 3 is also disposed above a U-tube bundle 2 with a tornado-flow separator connected in cascade after cyclone 3. Also provided are counter-flow cyclones 7 wherein a subsequent clarification of the water separated in the axial cyclone 3 takes place. The counter-flow cyclones 7 have upper inlets 9 disposed within the turbulence tube 4 of the axial cyclone 3. With this configuration, it is possible to reduce the diameter of the steam generator 1 at its upper region. This savings is especially significant with respect to the original volume indicated in outline by dotted line 26.

In the illustrated embodiment, the water lead-off conduit 18 of the tornado-flow separator 11 and the water outlet 27 of the counter-flow cyclones 7 empty into a common chamber 28 from which the water flows back again to the lower region of the U-tube bundle 2.

In this embodiment also, for the individual centrifugal force separators, the stabilization apparatus are in the form of a concave recess 20 on the flow body 5 of the axial cyclone 3 as well as in the form of shell-like plates 21 in the counter-flow cyclones 7.

By means of the combination of the convention centrifugal-force separators and the installation of the appropriate stabilization bodies for improving the capacity of separation of individual separator units, there is obtained alone through these centrifugal-force separators a steam dried or clarified to an extent that the fine separators, which were usually used up to the present time, can be rendered unnecessary. This affords a small construction space for the steam generator as well as a lower height and diameter, wherewith the costs are considerably reduced.

We claim:

1. Apparatus for drying the steam of a steam-water mix generated by a steam generator, comprising an axial cyclone arranged above the steam generator for separating at least a portion of the water from the steam-water mix so as to yield separated water and a remaining steam-water mix and for passing the water and the remaining mix in an upward direction, a plurality of counter-flow cyclones for receiving therein the separated water separated from the mix in said axial cyclone, each of said counter-flow cyclones comprising a wall defining a turbulence chamber, a tube extending into said chamber, and inlet guide vane means disposed concentric to said tube for imparting a spin motion to the separated water for separating the latter into water and clarified steam in said chamber, and a tornado-flow separator for separating the remaining mix into additional water and clarified steam, said tornado-flow separator being disposed above and coaxial with said axial cyclone, said tornado-flow separator having a lower axial inlet for admitting the remaining mix as well as having an upper outlet for discharging clarified steam, said tornado-flow separator also having an upper auxiliary gas inlet coaxial with said upper outlet for admitting the clarified steam separated in said counter-flow cyclones.

2. Apparatus of claim 1, said axial cyclone having a tube-like turbulence chamber, and said plurality of counter-flow cyclones being disposed outside said tube-like turbulence chamber so as to place said inlet guide vane means at the same elevation as the upper end of said tube-like turbulence chamber.

3. Apparatus of claim 1, said tornado-flow separator having water outlets feeding into corresponding ones of said cyclones at the respective lower regions thereof.

4. Apparatus of claim 1, said axial cyclone having a tube-like turbulence chamber, said inlet guide vane means being disposed within said tube-like turbulence chamber at the outer region thereof.

5. Apparatus of claim 4, said tornado-flow separator having a water outlet for the water, separated therein, said counter-flow cyclones having respective water outlets, said outlet of said separator and said water outlets of said cyclones terminating in a common discharge channel.

6. Apparatus of claim 1, said tubes of said cyclones being connected with said auxiliary gas inlet said tornado-flow separator.

7. Apparatus of claim 1, said lower axial inlet of said tornado-flow separator having an aperture disposed therein.

8. Apparatus of claim 1, said axial cyclone comprising a wall defining a turbulence chamber, a flow body beneath said turbulence chamber, and guide vanes disposed around said flow body for imparting a spin motion to the steamwater mix, and recess means in the upper end of said flow body for stabilizing the funnel-like figure caused by said spin motion and defining the boundary between the separated water and the remaining water mix.

9. Apparatus of claim 8, said recess means being a recess having an approximately concave shape.

10. Apparatus of claim 1, wherein the spin motion imparted to the separated water causes a funnel-like figure of steam to be formed in each of said counter-flow cyclones, each of said cyclones comprising a stabilization body for stabilizing said figure, said stabilization body being a shell-like body opening toward the upper region of said turbulence chamber of said counter-flow cyclone.

* * * * *